United States Patent
Harris

(10) Patent No.: US 9,118,628 B2
(45) Date of Patent: Aug. 25, 2015

(54) LOCKED E-MAIL SERVER WITH KEY SERVER

(76) Inventor: Scott C Harris, Rancho Santa Fe, CA (US)

( * ) Notice: Subject to any disclaimer, the term of this patent is extended or adjusted under 35 U.S.C. 154(b) by 2413 days.

(21) Appl. No.: 10/701,979

(22) Filed: Nov. 6, 2003

(65) Prior Publication Data

US 2005/0102511 A1 May 12, 2005

(51) Int. Cl.
*H04L 29/06* (2006.01)

(52) U.S. Cl.
CPC ............ *H04L 63/0428* (2013.01); *H04L 63/10* (2013.01); *H04L 63/1408* (2013.01)

(58) Field of Classification Search
USPC .......... 713/152, 155–158, 173, 175, 182, 185
See application file for complete search history.

(56) References Cited

U.S. PATENT DOCUMENTS

| | | | |
|---|---|---|---|
| 6,266,692 B1 * | 7/2001 | Greenstein ..................... 709/206 |
| 6,442,686 B1 * | 8/2002 | McArdle et al. .............. 713/151 |
| 6,725,381 B1 * | 4/2004 | Smith et al. ........................ 726/4 |
| 6,760,752 B1 * | 7/2004 | Liu et al. ........................ 709/206 |
| 6,978,025 B1 * | 12/2005 | Price, III ........................ 380/282 |
| 6,986,037 B1 * | 1/2006 | Assmann ........................ 713/155 |
| 2002/0007453 A1 * | 1/2002 | Nemovicher .................. 713/155 |
| 2002/0023213 A1 * | 2/2002 | Walker et al. .................. 713/168 |
| 2002/0169954 A1 * | 11/2002 | Bandini et al. ................. 713/153 |
| 2002/0199119 A1 * | 12/2002 | Dunnion et al. .............. 713/201 |
| 2003/0046533 A1 * | 3/2003 | Olkin et al. .................... 713/152 |
| 2003/0110400 A1 * | 6/2003 | Cartmell et al. ............... 713/202 |
| 2003/0196080 A1 * | 10/2003 | Karman ........................ 713/150 |
| 2003/0204569 A1 * | 10/2003 | Andrews et al. .............. 709/206 |
| 2003/0236847 A1 * | 12/2003 | Benowitz et al. ............. 709/206 |
| 2004/0003283 A1 * | 1/2004 | Goodman et al. ............ 713/201 |
| 2004/0025057 A1 * | 2/2004 | Cook ............................ 713/201 |
| 2004/0133775 A1 * | 7/2004 | Callas et al. .................. 713/153 |
| 2004/0243678 A1 * | 12/2004 | Smith ............................ 709/206 |
| 2004/0249817 A1 * | 12/2004 | Liu et al. ............................ 707/9 |
| 2006/0019634 A1 * | 1/2006 | Hawkes ........................ 455/411 |

* cited by examiner

*Primary Examiner* — Beemnet Dada
*Assistant Examiner* — Suman Debnath
(74) *Attorney, Agent, or Firm* — Law Office of Scott C Harris, Inc

(57) ABSTRACT

An email system using keys to open the server to receive messages. A message is created on a client, along with a request for the server to accept the message. The server will not even accept the message, unless the key is received. The key may be validated on many different levels of security; including length, or encryption code, or mathematical calculation. If the key is validated, the message can be received, either immediately, or later via a session code.

21 Claims, 4 Drawing Sheets

LOCKED E-MAIL SERVER WITH KEY SERVER

BACKGROUND

E-mail is an effective form of communication; however, is a very desirable target for advertising. Accordingly, the prevalence of Spam, or unwanted e-mail, has significantly increased over e-mail systems. This has led to spam filters which filter out the spam, but have a side effect of filtering out other e-mails which may not be spam. This has led many to believe that e-mail, as a medium, is itself flawed.

It is very difficult to effectively block e-mail from spammers based on characteristics of the email. Spammers use heuristic techniques to avoid the Spam filters. Even if the Spam is filtered, this typically only prevents the spam from reaching the user's mailbox. The sheer amount of Spam may overwhelm an email server.

The process of sending a text message from a sender to a recipient is well established. The process of conventional e-mail is defined by a number of different interacting protocols and servers.

In conventional e-mail, a personal computer 100 runs an e-mail client 102. Well-known e-mail clients include Microsoft outlook and Outlook express. The e-mail client may be a standalone client, or may be a modified e-mail client running within a web page such as "Hotmail". The e-mail client lists the messages in the user's mailbox by headers, and allows the user to select and read the e-mail that is associated with that header. An e-mail client also allows creation of new messages and sending of the new messages.

The e-mail client communicates with an e-mail server 120 at the user's local Internet Service provider, here shown as "domain" 99, in order to send and receive messages over the Internet 110 or more generally over any network connection. The server receives e-mail messages from a client 102, and forms a list of those messages. The server 120 typically includes a processor or computer of some type, running the special email programs that are described herein.

The mechanics of the e-mail system operate by using three different protocols, known as SMTP, POP3 and IMAP. The SMTP server listens on port 25 to receive its emails. In order to send an e-mail, the e-mail client 102 interacts with the SMTP server 130 at the domain 99.

If the message is for another mailbox within the same domain, then the SMTP server 130 sends the message to the local POP3 server 140. The POP3 server 140 handles delivery of local messages to the local mailboxes, such as 145. This mailbox is really a queue that is formed to provide the message to some other email client, when that client logs in to the POP3 server 140.

If the message is intended for another domain, the SMTP server communicates with a domain name server or DNS 135. The DNS stores a database, which is updated from the Internet, that stores the IP address for all domains. The DNS provides the IP address to the SMTP 130.

In order to streamline all the operations, software called a "picker" often operates to look at messages stored on the SMTP server's hard drive, and carries out the mechanics of analyzing the message headers for destination, communicating with the DNS, and looking for an available port for the SMTP server on the desired domain.

Once this is completed, the SMTP server 130 sends the message using the IP address that it obtained from the DNS server 135, to another server 150 at another domain 149. The SMTP server 130 communicates with the corresponding SMTP server 155 at domain 149. The message is transferred to the SMTP server 155 at domain 149. Since SMTP server 155 recognizes that the message is for a local mailbox, it provides the message to its local POP3 server 160, which queues the message to a local mailbox 165.

The program for sending mail is often an open-source program known as Sendmail™ which also includes the ability to queue messages which cannot be sent immediately.

In order to receive local mail, the e-mail client 102 communicates with the POP3 server 140 in its local domain 120. The POP3 server maintains a collection of text files, one for each e-mail that has been sent or received. Each time a new e-mail is received, it adds that e-mail to its recipient file, or mailbox. The POP3 server provides the e-mail client 102 with contents of its mailbox, and then deletes them.

An IMAP server may be used in addition to or in place of POP3. IMAP allows the e-mail into folders which stay on the server.

For a large e-mail server, there may be many pickers operating at once, e.g. 50 to 100 pickers. Each of these pickers are obtaining information from the SMTP server's hard drive, moving messages one at a time from the hard drive. Data throughput limitations are often caused by this operation.

A spam filter may operate anywhere within the chain shown above, but most often runs between the email client and the POP3 server that holds the emails for the email client. This means that all the spam emails must be received by the SMTP server, and by the POP3 server and handled, processed, and stored.

SUMMARY

A new form of electronic mail communications is described which uses a locked e-mail server. The server is unlocked by a key that is produced by the email producer. The key may include a unique portion, to avoid it being used by an unauthorized source. The key can be generated based on a code, or can be obtained in different ways. The requirement for a key allows the e-mail server to monitor and control the sources that send e-mail.

The e-mail client, that is the client that uses the e-mail, must obtain a key, and use the key to obtain access. The key can have a limited life and/or can require a calculation. The limited life key can prevent spamming, by preventing a spamming e-mail server from sending too many e-mails. The calculation requires the sending server to carry out a calculation which, while trivial for a computer sending five e-mails, may become overwhelming for computer that sends 5 million e-mails.

The key can be made from a calculation which is based on a large number or alphanumeric code that is associated with the recipient. Alternately, the key can be just a limited life key that is provided by the SMTP server of the receiving email computer.

A number of different keys are described, however many other different kinds of keys can be used with this system. In addition, this system describes use with an SMTP server, but it should be understood that any kind of email server can interact with the key system described herein.

This system has many advantages. It may prevent Spam from even getting through to the (server) SMTP server in the first place, thus reducing the computing load attributable to the spam. This compares with current systems that typically actually increase the computing load for spam. Current systems carry out processing on the received mail, this processing adding to the total processing load. In contrast, the present system does a calculation to determine if a transmission is authorized, and, if so, opens the gate and allows the transmission to be received. No further processing is necessary. Moreover, presumably, the incoming messages are not spam, since each message has been accompanied by a valid key.

BRIEF DESCRIPTION OF THE DRAWINGS

These and other aspects will now be described with reference to the accompanying drawings, in which.

DETAILED DESCRIPTION

Figure 1:
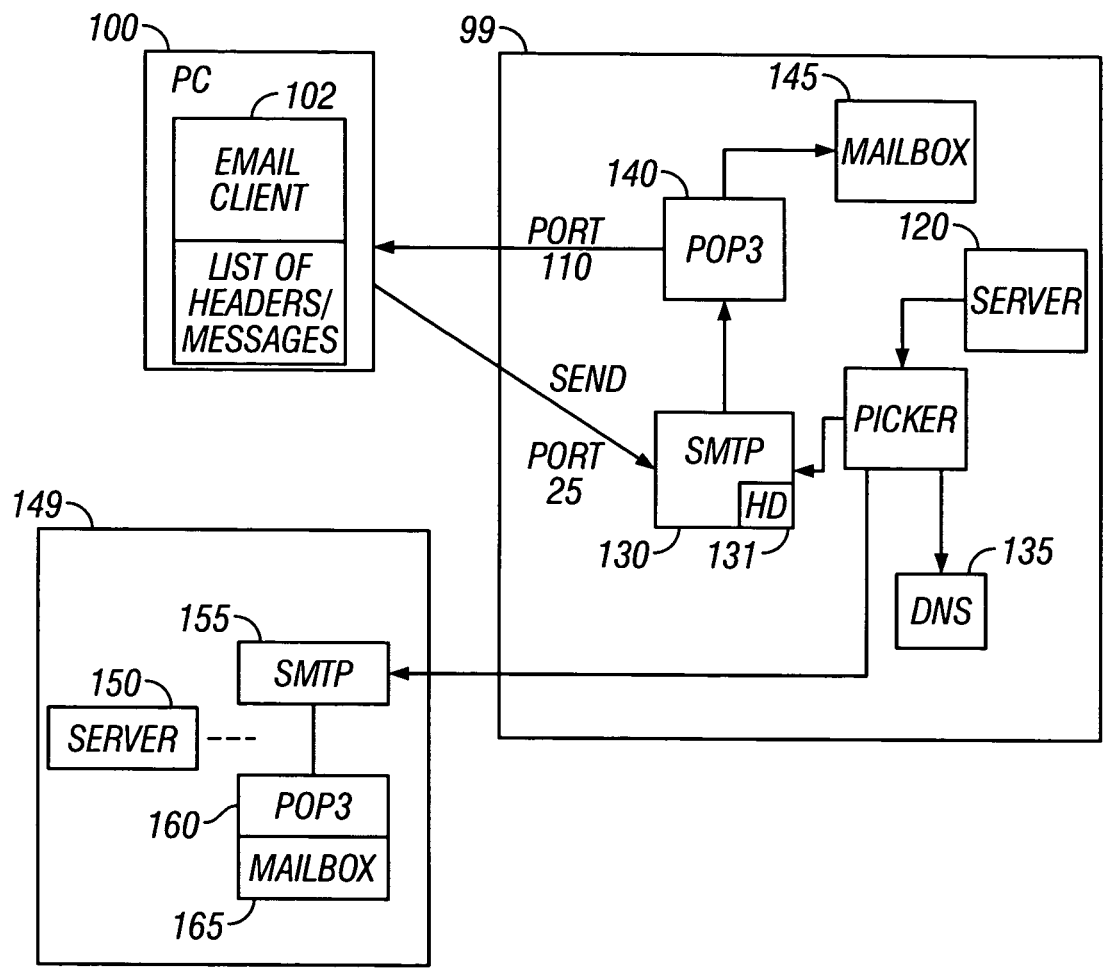
FIG. 1 shows a Figure of a conventional email system.
Figure 2:
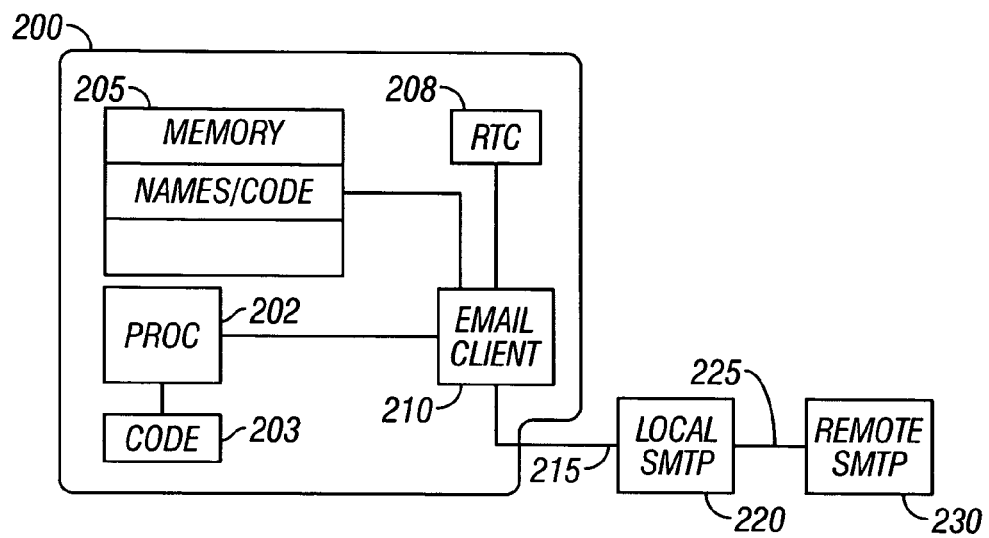
FIG. 2 shows a basic hardware system of the email system according to the present system.

The basic hardware system is shown in FIG. 2. A standard computer 200 includes a processor 202 therein. The processor is associated with a unique code 203 which may be processor code associated with a processor itself (for example, the so-called processor ID), or may be a code that is assigned to the software or a code set by the user such as their own encryption code. An associated memory 205 to may store an address book as well as codes associated with items that are in the address book. The storage may include contact name, contact email address (a@b.com), and contact code. The contact code may be a 56 bit or 128 bit code, stored in hex. The computer 200 also includes a clock as conventional 208, and runs an e-mail client 210 of any type.

The e-mail client 210 in the computer 200 is connected to the user's local SMTP server 220 over a network line 215. The SMTP server 220 may be at the users local ISP. The SMTP server communicates as conventional over a network 225, such as the Internet, to any of a number of remote SMTP servers 230.

In the most basic system, the sender uses a code to create a unique first message part or "key". The key is a request that forms the request to the remote SMTP server 230, to allow the message to pass to that Remote SMTP server 230. The recipient 230, here an SMTP e-mail server, receives the key, and determines if the key is accepted or not accepted. The acceptance can be based on a calculation or based on a lookup table or the like. For example, an email key may be an encryption key formed based on public-key cryptography. If public-key cryptography is used, the "OK" decision may be made by verifying that the signature is accurate or that some aspect of the user's name is accepted.

In another embodiment, a one time code is used. This code may be compared against an authorized code or criteria to determine whether access should be granted. If the key succeeds, it opens the door for the second message part, which is the guts of the message, typically the text part of the message, to be sent. The one time code may simply be a random number that is generated by the client 210. In a lower security version of the system, any random number can be used as the code, and the simple act of requesting access is the act that thwarts spammers. Another version grants access to the key if of the proper length; and if not, sends back an image file that, when viewed by a user, says the proper length code, to allow that length to be added into the 205 associated with the email client 210.

The key which is sent is preferably less than the whole message.

Once the communication channel is opened by the key, a second message part 220 is sent that includes the message, typically a text message for sending by the SMTP server.

A basic strategy of the present system is to make the sender of the e-mail do some work in order to send the email. A legitimate e-mail sender can easily enough do this when they are sending 50 or even 100 e-mails a day. This amount of work will put almost no strain on the sender of legitimate e-mails. However, when the e-mail sender is sending thousands or more e-mails a day, this system limits the number of emails that can be sent.

In addition, by blocking the e-mail based on an invalid key, this system prevents that e-mail from ever even entering the system.

Figure 3:
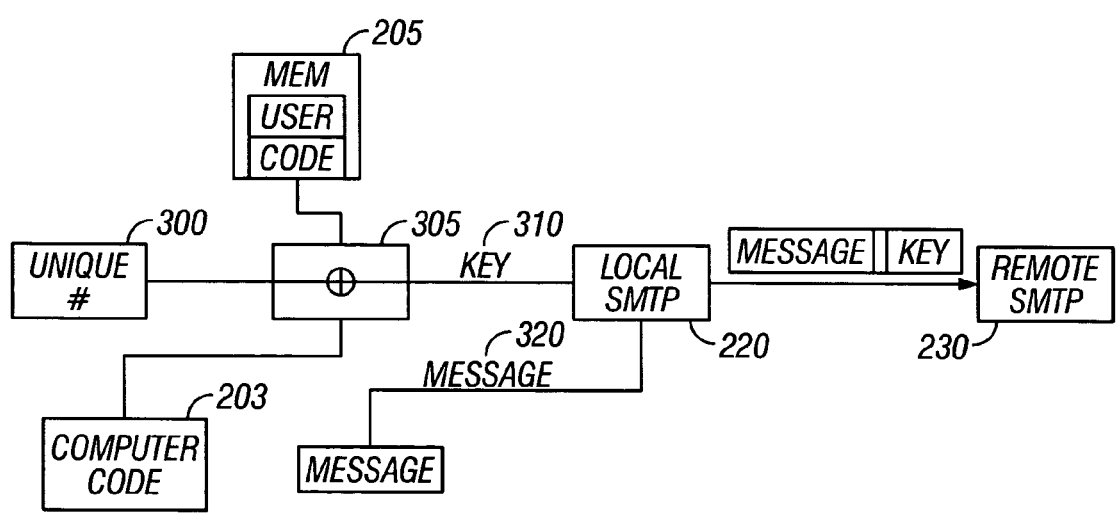
FIG. 3 shows a flowchart of an embodiment.

A first embodiment operates as shown in the flow diagram of FIG. 3. The key and the message are separately formed. The memory 205 stores user information including the user code which is associated with the user.

A first embodiment uses a form of public-key cryptography as the code. This system requires the person or server that once to sending e-mail to receive or have a public-key code that is associated with the recipient of the email. For example, this may be obtained as a signed value, from a floppy disk, or over e-mail with a specified password. It may also be obtained from a standard key server, or by less secure means. The public key code is stored in memory 205, along with the contact information.

Another embodiment may use other kinds of information at the users code, for example simply a random number.

A unique number is generated by the unique number generator 300 which may be simply a real-time clock generating a code indicative of date and time. This may alternatively use a random number generator. The computer code 203 also forms an input. The three pieces of data are combined by a data combination mechanism 305 which may be a process running in the processor. In the first embodiment, where the code is an encryption key, the encryption key may simply be used to encode one or both of the unique number and/or computer code in order to form the key shown as 310.

The key is provided to the local SMTP server 220 and the message 320 is also provided to the local SMTP server. The SMTP server 220 uses the message to look up domain name information of the remote SMTP server, and forms a message including both the key and the message as two parts of a single communication.

Figure 4:
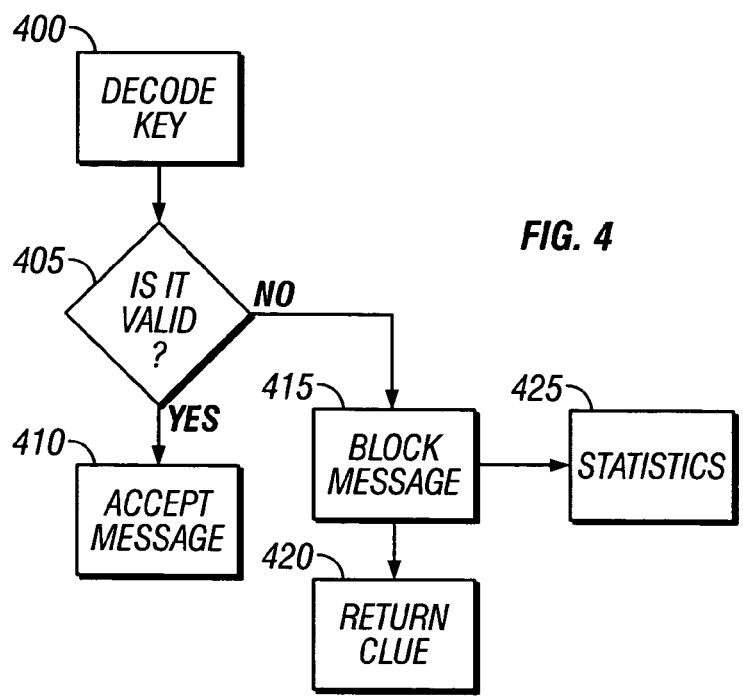
FIG. 4 shows a flowchart of a routine executed by the remote server.

The remote SMTP server 230 carries out the flowchart shown in FIG. 4 when it receives a message. First, at 400, the remote SMTP server decodes the key or some part of the key. In the embodiment shown herein in which the key is an encryption key, this may simply be a decoding operation or even more simply, a verification operation of the type which simply validates whether the message has been encoded by a valid key or not. Additional operations may also be carried out as part of the decoding; for example, the value within the key may be validated against a list of previously used numbers, or against a current date and time. In this embodiment, if 405 determines that the key is valid, then the message is accepted at 410. If the key is not valid, then the message is blocked at 415.

In this embodiment, the system also returns a "clue", responsive to the blocked message. The clue may be something which is returned to the user to allow a user to find information to produce a valid key. Rather than returning the key itself (which is also possible), the clue may be a link to a key server, or a link to a web site that shows a valid key. The clue can also be an image, with key information, e.g. the key itself or a link to the key. The image can be looked at by a user, but not by a "spambot".

The user can follow this clue in order to find a valid code, and can thereafter form a valid code. The remote SMTP server can also retain statistics at 425 including statistics about the codes that form invalid keys, and also information about previous random numbers that have been used within keys. A random number may only be allowed to be used once in 24 hours, for example. Also, for example, if a specific computer sends 1000 invalid keys in a specified time, that computer may be marked as a spammer for the short term. Since one trick is for spammers to use other people's computers and other e-mail servers, this Spam marking may only last for 24 hours for example.

Figure 5:
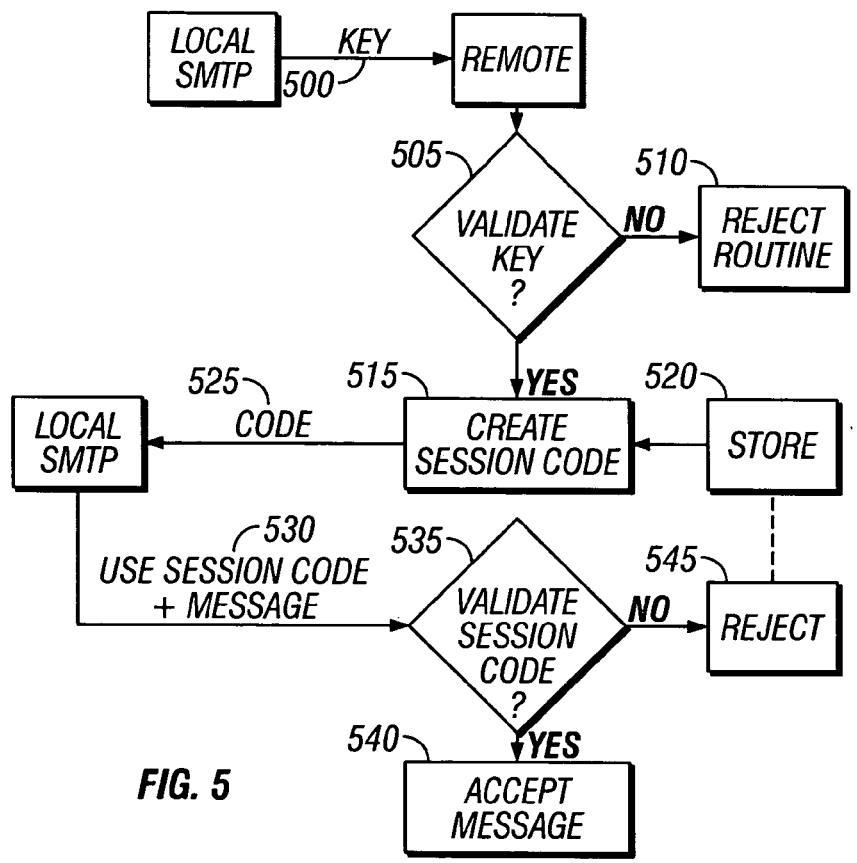
FIG. 5 shows the information flow between servers.

FIG. 5 shows an alternative embodiment flow, simply showing the information flow between SMTP servers. The local SMTP server first sends a key shown as 500 in this embodiment to the remote. The remote validates the key at 505, and if invalid, calls the reject routine at 510. The reject routine may be as shown in steps 415-420 of FIG. 4.

However, if the key is validated, then the remote SMTP creates a session code at 515. The session code may be a onetime random number which is good for a specified time and/or number of e-mails. The session code is locally stored at 520, and also sent at 525 back to the local SMTP. The local SMTP receives the session code and takes it as an authorization to send one or more messages. The session code is used as the key to open the door for the messages at 530. This is sent back to the remote which validates the session code at 535, by accessing the list of valid session codes stored in the storage. The validation may include determining whether the specified time for which the session code is valid has elapsed, and/or validating the number of e-mails which have been sent. If the session code is validated at 535, then the message is accepted at 540. If not, the reject routine may again be called at 545.

Figure 6:
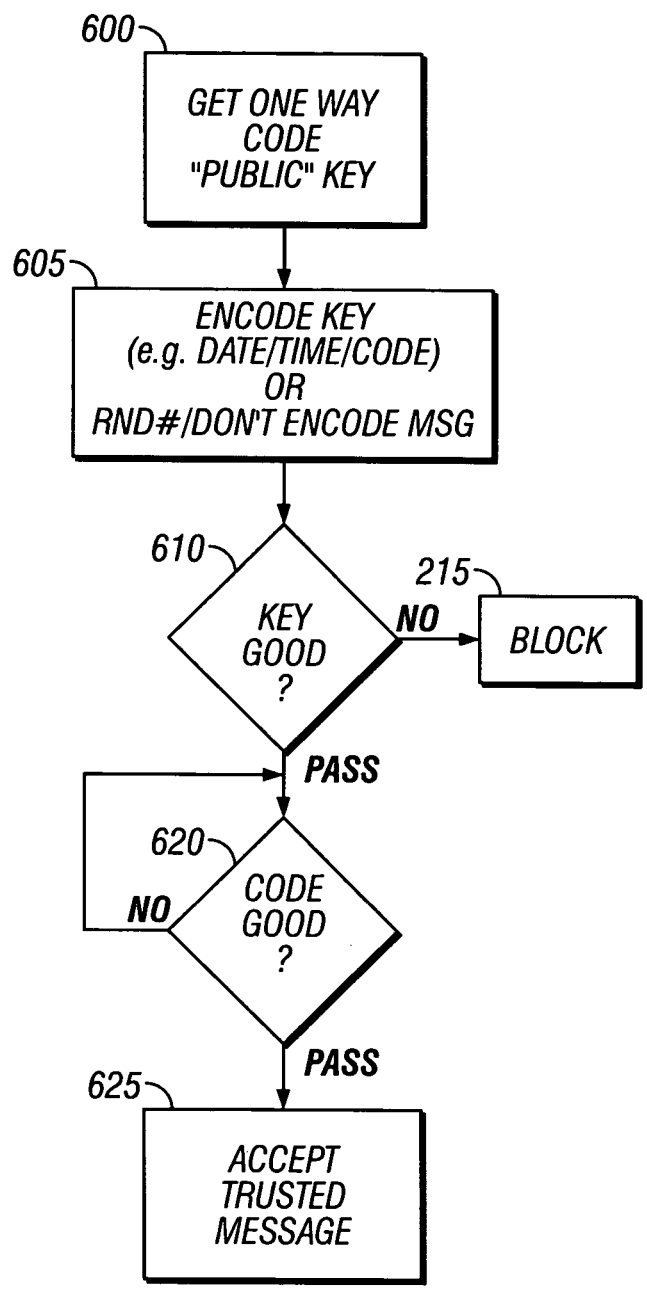
FIG. 6 shows operations between the processors.

The flowchart of FIG. 6 shows operations that are carried out by the respective processors. At 600, one of the computers gets an encryption key, for example a public-key of a public/private key system. More generally, this can be a one-way code that can be used to encrypt the message, but not to decrypt or verify the message. This key will be used to form the key that will open the gate for the message. At 605, a key of specified form is encoded using the obtained key, and a unique message. In one embodiment, the unique message may simply be of value indicated of current day and or time. In advantage of this system is that the key can not then be reused. An alternative may simply use a random number. In any case, the opening key which is encoded at 605 should preferably include less than the entire message. At 610, the system determines if the key is good. This can be done by verifying whether the private key properly decrypts the contents of the public-key. If the key is not good at 610, then the message is blocked at 615; effectively the key has failed to open the door. If the key is good at 610, however, 620 follows an operation which may be optional to determine if the code within the key is good. For example, the code may be Greenwich mean Time indicating the time that the encryption was made. This encryption may be determined to be valid for five minutes. At 625 a trusted message is accepted. Even if the code is not good at 620, however, a proper key was used, so the message should be accepted even if not trusted. This may be considered as passing a less than completely trusted message.

An advantage of this system is that there needs to be a calculation and/or handshaking for each e-mail; otherwise the e-mail will be blocked by the recipient. Any block along the way of the e-mail can check the code/Time and determine whether it is accurate or authorized. The calculation load on a spamming sender may be enormous, however the calculation load on a system which is sending authorized e-mails, and therefore presumably sends only a few e-mails at a time, is effectively negligible. Moreover, this prevents the spamming emails from even being received by the receiving server.

The above has described using a one-way code, however, any calculation that can be determined to be valid can be used for this system.

Although only a few embodiments have been disclosed in detail above, other modifications are possible.

What is claimed is:

1. An e-mail method operating on a computer, comprising:
on a computer, receiving only a request from an e-mail sender, where the request does not include a message part of an email, and where the request indicates that an email sender is requesting to send the message part of the e-mail, that is separate from the request;
using said computer for verifying said request by determining if said request is a result of properly making a calculation on a remote computer and that said calculation on said remote computer is not a calculation that was previously verified, said verifying carried out by said computer, prior to receiving said message part of the email;
only if said request is verified, producing a key using said computer, that is used to automatically receive said message part, where said key is only valid for a limited period, but is valid for more than a period of a single email, and where said key allows multiple messages to be automatically received without requiring said verifying to be carried out, only during said period during which the key is valid;
using said computer for preventing the message part of the email, other than the request, from being received if said request is not verified; and
if said request is verified, receiving multiple messages from said email sender, but only during said limited period while said key is valid.

2. A method as in claim 1, wherein said verifying validates that said calculation using an encryption function was used to form the request.

3. A method as in claim 1, wherein said limited period is measured by a specified number of emails that are sent using said key, where said key is valid until said specified number of emails have been sent using said key, and said key expires after said specified number of emails has been sent using said key, and where said key can no longer be used to send emails after it expires.

4. A method as in claim 1, wherein said limited period is a period of 5 minutes.

5. A method as in claim 1, wherein said verifying comprises checking the calculation against a list of previously used numbers.

6. A method as in claim 1, wherein said verifying comprises checking the calculation against a current date and time to determine if the calculation represents information associated with the current date and time.

7. A system comprising:
an e-mail communication client, having a communication function adapted for connection to a network to receive communications from the network, and having a controller, said controller operative to detect a request for e-mail transmission at a first time, where said request for email transmission requests permission to send an email, and wherein said client does not receive a message to be sent at said first time, said controller operating to analyze said request to determine if said request results from a specified calculation having been properly made on a remote computer, and if said request is verified as having been the result of said calculation having been properly made, producing a key that allows receiving emails from a specific sender who sent said request starting at a second time after said first time, and automatically receiving said emails from said specific sender without further verifying, and where said key is only valid to allow receiving said emails for only a limited period, but is valid for longer than a period of a single email, and wherein said key allows messages to be received and said controller is responsive to said key, and operative to automatically receive messages without requiring said request to be analyzed as having been the result of a calculation that was properly made, but only during said period during which the key is valid, at times starting at said second time, and wherein said messages are not received by the e-mail communication client if said controller determines that said request does not properly result from said specified calculation having been properly made, and and said controller also allows other messages to be received from the specific sender, during said limited period without requiring another request to be analyzed as having been the result of a calculation that was properly made during said limited period, but to no longer to allow said emails to be received subsequent to said limited period without requiring said request to be analyzed as having been the result of a calculation that was properly made.

8. A system as in claim 7, wherein said limited period is a limited number of messages that can be sent using said key, after which, said key can no longer be used to send messages and wherein a validity of said key is measured by a specified number of messages that are sent using said key, where said key is valid until said specified number of messages has been sent using said key, and said key expires after said specified number of messages has been sent using said key.

9. A system as in claim 8, wherein the calculation comprises validation that an encryption function was properly used to form said request.

10. A system as in claim 7, wherein said limited period is a time period of 5 minutes.

11. A system as in claim 7, wherein said controller analyzes by checking the calculation to ensure that the calculation is unique and was not a calculation that had been previously verified.

12. A system as in claim 11, wherein said controller verifies a request by checking the calculation against a list of previously used numbers.

13. A system as in claim 11, wherein said wherein said controller verifies a request by checking the calculation against a current date and time to determine if the calculation represents information associated with the current date.

14. A method, comprising:
on a computer, obtaining a message to be sent to a remote location;
obtaining a code, of a type which can be verified by the remote location as having been a result of a specified unique calculation on said computer, that is unique and is not a calculation that has been used for obtaining the code at some other time, said code being obtained by carrying out said unique calculation;
using said computer for sending the code as a key prior to sending the message;
receiving an acceptance message on said computer if the key is verified, and receiving a rejection message if the key is not verified,
where the rejection message is received via email also includes information in a form that can be understood by a human operator but can not be interpreted by a machine, and said information indicates how a valid key can be formed; and
responsive to said receiving said acceptance message, automatically sending plural different email messages using said key prior to expiration of said key, and not sending further email messages after expiration of said key.

15. A method as in claim 14, wherein an expiration of said key is measured by a specified number of emails that are sent using said key, where said key is valid until said specified number of emails has been sent using said key, and said key expires after said specified number of emails has been sent using said key.

16. A method as in claim 15, wherein the unique code uses date or time, or a random number.

17. A method as in claim 15, wherein said unique calculation creates a number that has not been previously used.

18. A method as in claim 15, wherein said unique calculation is based on a current date and time, and can be tested to determine if the calculation represents information associated with the current date and time.

19. A method as in claim 11, wherein said information from which the valid request can be formed, in said message, is in a form that can be understood by a human operator but can not be interpreted by a machine.

20. A method as in claim 1, wherein said verifying uses information that was not known in advance.

21. A system as in claim 8, wherein the calculation comprises validation of information that was not known in advance.

* * * * *